T. A. JORDAN.
KAFIR CORN HEADER.
APPLICATION FILED JAN. 12, 1912.
1,053,401.
Patented Feb. 18, 1913.
2 SHEETS—SHEET 1.
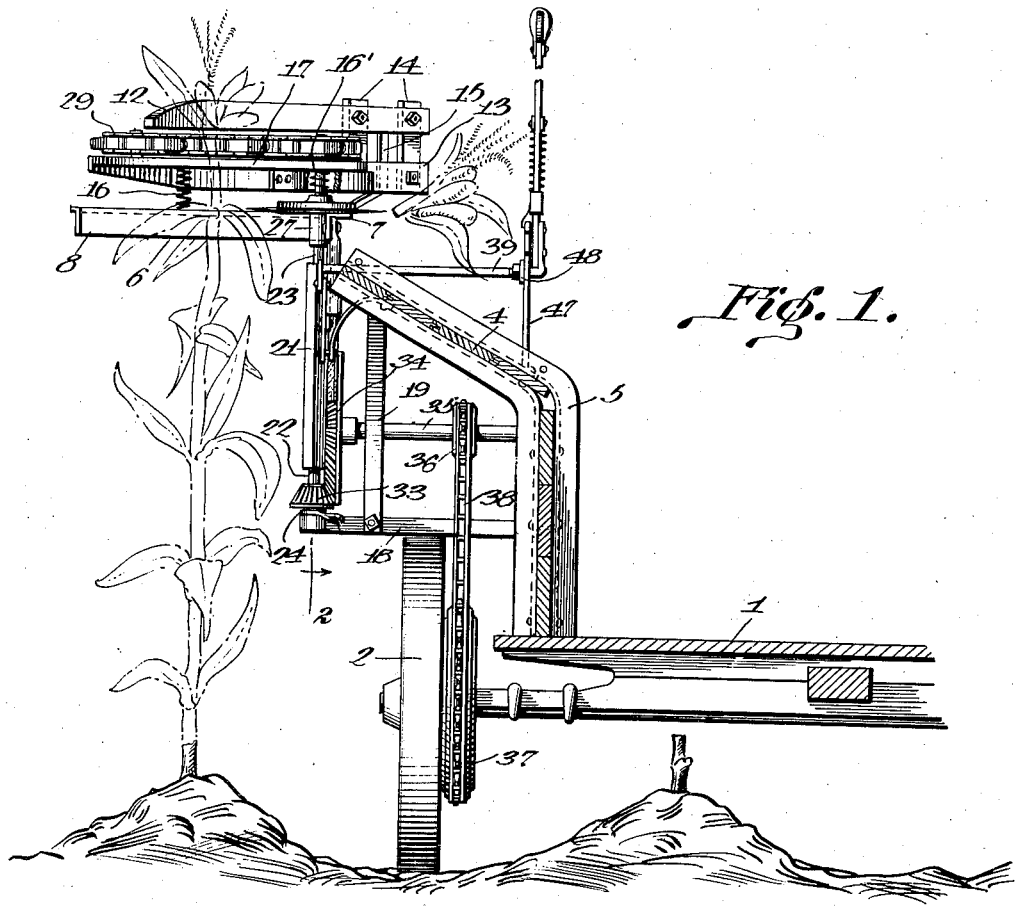
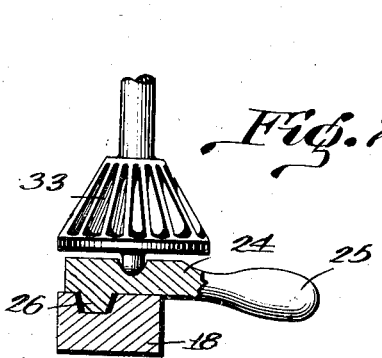
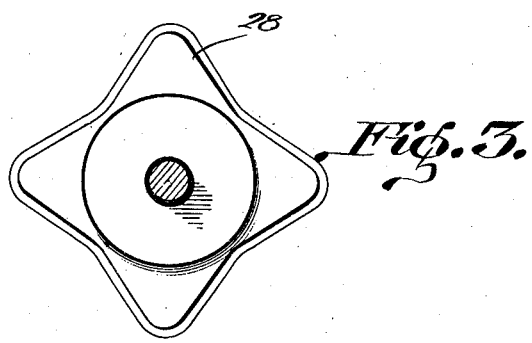
Witnesses:
Emmit McNeil
Inventor:
Thomas Allison Jordan

UNITED STATES PATENT OFFICE.

THOMAS ALLISON JORDAN, OF PONCA, OKLAHOMA.

KAFIR-CORN HEADER.

1,053,401. Specification of Letters Patent. Patented Feb. 18, 1913.

Application filed January 12, 1912. Serial No. 670,964.

*To all whom it may concern:*

Be it known that I, THOMAS A. JORDAN, a citizen of the United States, residing at Ponca city, in the county of Kay and State of Oklahoma, have invented certain new and useful Improvements in Kafir-Corn Headers, of which the following is a specification, reference being had to the accompanying drawings.

This invention comprehends certain new and useful improvements in corn harvesters and relates more particularly to machines designed especially for heading or topping Kafir-corn.

The primary object of the invention is to provide a Kafir-corn header which may be attached to an ordinary farm wagon and which may be adjusted vertically to properly cut various heights of corn.

The invention also aims to provide a machine of this nature which will load the cut corn into a wagon without the use of elevating mechanism.

A further object of the invention is to provide a Kafir-corn header, embodying a revolving cutter driven by suitable gearing connected to one of the wagon wheels, means for drawing the corn into contact with said cutter and a sloping deck for directing the corn into the wagon, which will be simple in construction and efficient in operation.

The invention also aims to generally improve devices of this nature to render them more useful, durable and commercially desirable.

With these and other objects in view, as shall become more apparent as the description proceeds, the invention consists in certain novel features of construction and arrangement of parts as I will hereinafter fully describe and claim.

For a complete understanding of my invention, reference is to be had to the following description and accompanying drawings, in which—

Figure 4:
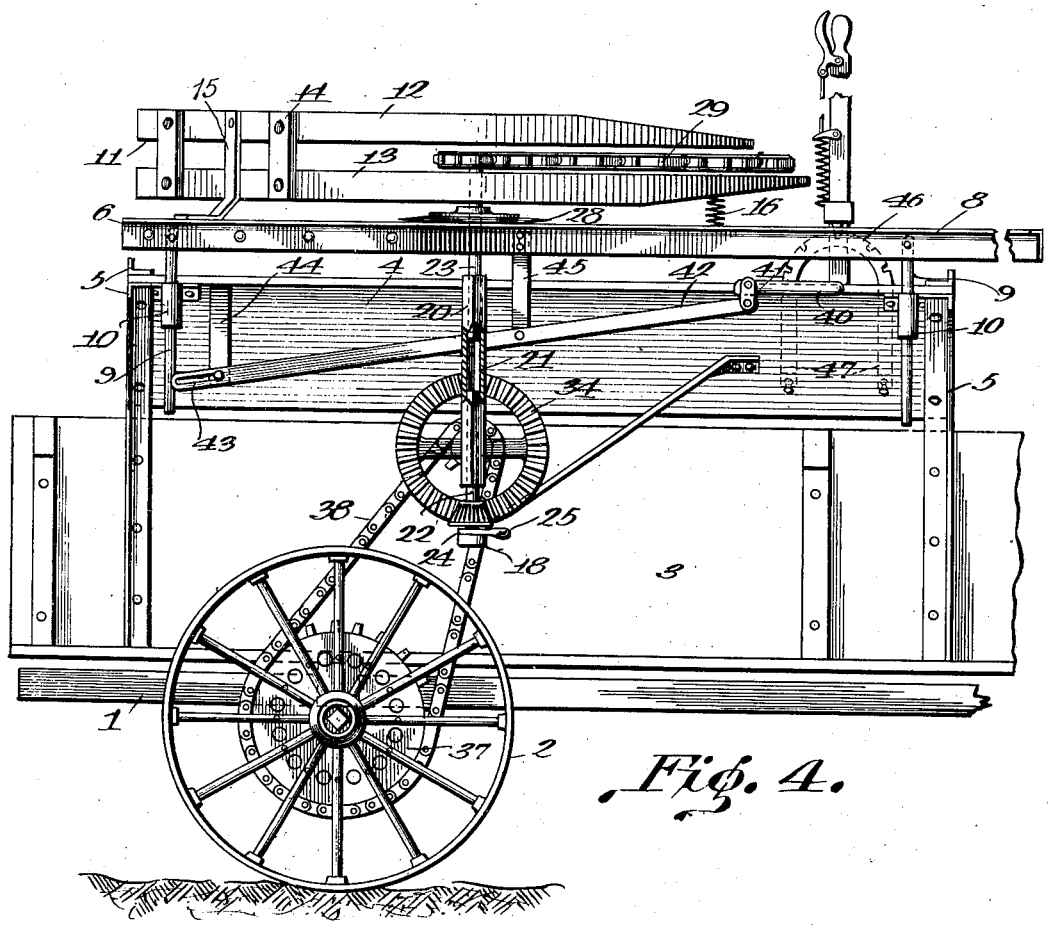
Figure 5:
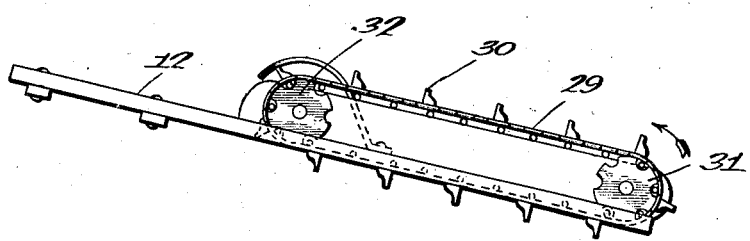

Figure 1 is a front elevation of my invention. Fig. 2 is a detail of the gear shifting mechanism taken on the plane of line 2 in Fig. 1. Fig. 3 is a top plan view of the cutter. Fig. 4 is a side elevation of my invention, and Fig. 5 is a top plan view of the drag chain and supporting means therefor.

Referring more particularly to the drawings, 1 designates a wagon having wheels 2 and sides 3, only one of each being shown. Attached to the side 3 is a sloping deck 4 extending longitudinally of the wagon and adapted to discharge into the same. A pair of angle iron bars 5 are secured to each end of the deck and the members of each pair project downwardly past the inner edge of the same to form two pair of spaced legs which fit over the side 3 and hold the deck in position. These bars also form the end walls of the deck.

A guide frame generally designated 6 is adjustably mounted on the deck 4 and comprises a straight bar 7 to the rear portion of which is riveted a bar 8 which parallels the bar 7 for a short distance and then projects forwardly and outwardly giving to the frame a somewhat Y-shape. Depending rods 9 are secured to the inner side of the bar 7 near its end and by passing through the tubular brackets 10, carried by the under surface of the deck 4, serve to guide the frame 6 as it is shifted into different horizontal planes.

The member 8 of the frame 6 supports a frame 11 formed of two bars 12 and 13 held one above the other in spaced relationship by the uprights 14. A standard 15 connected to the frame 6 pivotally supports the rear portion of the frame 11 while the front portion is supported by the spiral spring 16. It will be apparent that this method of supporting the frame 11 allows the same to give slightly which will diminish the effect of any strain to which it may be subjected. A longitudinally extending strip 17 is secured to the inner side of the frame member 13 adjacent its upper edge and it is against this strip that the spring 16 bears.

A gear supporting frame of which the arm 18 forms a part is secured to the under side of the deck 4 and braced by the bar 19. A vertical telescoping shaft 20 comprising a central tubular portion 21 rectangular in cross section, a lower portion 22 welded in the central portion and an upper portion 23 slidably mounted in the central portion, is supported at its lower end in a socket formed in the bearing plate 24. This plate is provided with a radially extending handle 25 and a downwardly projecting lug 26 which is received in a socket formed in the end of the frame member 18. As shown in Fig. 2, the lug 26 is not in vertical alinement with the shaft 20 and therefore said shaft will be shifted laterally when the plate 24 is rotated. The upper end of the shaft 20 passes through a suitable guide bearing 27 secured to the bar 7 near the point of divergency of the bar 8 and also through the strip 17 on the frame 11. A cutter 28 shaped as shown in Fig. 3 is threaded on the shaft 20 between the two frames. A spiral spring 16' is interposed between the cutter and the frame 11 and helps support said frame.

A drag chain 29, having a plurality of arms or fingers 30, runs between the members 12 and 13 of the frame 11 over the sprocket wheel 31 mounted on the frame and the sprocket wheel 32 keyed to the shaft 20. Any suitable means may be employed for tightening this chain. A bevel gear 33 is keyed to the lower end of the shaft 20 and meshes with the bevel gear 34 carried by the shaft 35 which is driven by the wagon wheel 2 through the medium of the sprocket wheels 36 and 37 and the sprocket chain 38.

The means which I have provided for raising and lowering the frame 6 comprise a transverse rod 39 having a rearwardly extending arm 40 formed on its outer end. A link 41 connects the arm 40 to a longitudinal bar 42 which extends downwardly and rearwardly in vertical alinement with the bar 7. The rear end of the bar 42 is longitudinally slotted as at 43 and is adjustably connected to the bracket 44. Intermediate the ends of the bar 42 is positioned a vertical standard 45 connected to said bar and to the bar 7 of the frame 6. A notched segment 46 having the legs 47 is secured to the upper surface of the deck 4 adjacent the forward end. It extends longitudinally of the deck and has a cross bar 48 which supports the inner upturned end of the rod 39 to which a shifting lever, having the customary locking pawl, is attached.

It is believed that the foregoing description in connection with the accompanying drawings is sufficient to make clear the construction of my improved Kafir-corn header.

In operation the revolving shaft 20 actuates the cutter 28 and the drag chain 29. As the machine is drawn along a row of corn, the Y frame 6 guides the corn stalks against the drag chain which carries them into contact with the cutter which severs the tops of the stalks. They drop on the sloping deck 4 and roll into the wagon 1. By throwing the lever forward the arm 40 raises the bar 42 which lifts the frame 6 through the agency of the standard 45. The cutter moves with the frame. To throw the cutting mechanism out of gear it is only necessary to rotate the plate 24.

It is to be understood that while I have shown and described a preferred form of my invention, minor changes in construction and arrangement of parts may be made without departing from the scope and spirit of the invention.

What I claim is:—

1. A Kafir-corn header, comprising a horizontally positioned Y-shaped guide frame adapted to be secured to the side of a vehicle, a second frame positioned above said guide frame and comprising a pair of spaced parallel bars positioned one above the other, a standard pivotally connecting the rear end of said second frame to the guide frame, spiral springs supporting the forward end of the upper frame, a vertical shaft extending through said frames, a rotary cutter keyed to said shaft, a horizontal drag chain running between the bars of the second-mentioned frame and means for actuating the aforementioned movable parts.

2. In a Kafir-corn header, the combination with a vehicle, of a sloping deck secured to one side of said vehicle and adapted to discharge into the same, a Y shaped frame mounted on the outer edge of the sloping deck, means for raising and lowering said frame, a second frame supported on said frame, and extending forwardly and outwardly, means for supporting the second frame, said means comprising a rigid arm and a plurality of spiral springs, a gear supporting frame secured to the under side of said deck, a vertical telescoping shaft, gearing driven by one of the vehicle wheels for rotating said shaft, the shaft extending upwardly between the members of the Y frame and through the lower member of the second mentioned frame, a cutter threaded on said shaft between the two frames and a drag chain running through the second mentioned frame and driven by said vertical shaft, said drag chain being provided with gathering fingers for forcing the corn against said cutter.

3. A Kafir-corn header, comprising a guide frame adapted to be secured to the side of a vehicle, cutting mechanism carried by said guide frame, means for operating said mechanism, means for raising and lowering said guide frame, said last mentioned means comprising a transverse rod having a rearwardly extending arm formed on its outer end, a handle secured to the inner end of said rod, means for locking said handle in any adjusted position, a rearwardly and downwardly extending bar formed with a longitudinal slot in the rear end thereof, a link connecting the forward end of said downwardly extending bar to the rearwardly extending arm formed on the aforementioned transverse rod, a standard secured to the bar intermediate its ends and to the guide frame, and a fixed bracket slidably connected within the longitudinal slot formed in said bar.

THOMAS ALLISON JORDAN.

Witnesses:
 LEONARD FRANKLIN SHUCKENGAUST,
 GEORG W. GILLESPIE.